(12) United States Patent
Lin et al.

(10) Patent No.: US 8,972,880 B2
(45) Date of Patent: Mar. 3, 2015

(54) APPLICATION PROGRAMMING INTERFACE FOR TRANSFERRING CONTENT FROM THE WEB TO DEVICES

(75) Inventors: Daniel J. Lin, San Francisco, CA (US); Christopher K. Hess, San Francisco, CA (US); Robert J. Morgan, San Rafael, CA (US)

(73) Assignee: Pendragon Wireless LLC, Kirkland, WA (US)

( * ) Notice: Subject to any disclaimer, the term of this patent is extended or adjusted under 35 U.S.C. 154(b) by 355 days.

(21) Appl. No.: 12/398,102

(22) Filed: Mar. 4, 2009

(65) Prior Publication Data
US 2010/0229243 A1    Sep. 9, 2010

(51) Int. Cl.
G06F 3/0486 (2013.01)
G06F 17/30 (2006.01)
G06F 21/10 (2013.01)
H04N 21/258 (2011.01)
H04N 21/2665 (2011.01)
G06F 3/0481 (2013.01)
G06F 21/00 (2013.01)

(52) U.S. Cl.
CPC .......... *G06F 17/30896* (2013.01); *G06F 21/10* (2013.01); *H04N 21/25875* (2013.01); *H04N 21/2665* (2013.01); *G06F 3/0481* (2013.01); *G06F 21/00* (2013.01); *G06F 3/0486* (2013.01)
USPC ............. 715/769; 715/760; 715/748; 726/27; 380/279

(58) Field of Classification Search
CPC . G06F 21/00; G06F 17/30896; G06F 3/0486; G06F 21/10; H04N 21/2665; H04N 21/25875
USPC .............. 726/27; 715/769, 760, 748; 380/279
See application file for complete search history.

(56) References Cited

U.S. PATENT DOCUMENTS

| | | | |
|---|---|---|---|
| 7,774,384 B2 * | 8/2010 | Kortum et al. | 707/805 |
| 2002/0055908 A1 * | 5/2002 | Di Giorgio et al. | 705/41 |
| 2007/0183741 A1 * | 8/2007 | Lerman et al. | 386/54 |
| 2009/0006211 A1 * | 1/2009 | Perry et al. | 705/14 |

* cited by examiner

*Primary Examiner* — Kambiz Zand
*Assistant Examiner* — Ayoub Alata
(74) *Attorney, Agent, or Firm* — Mauriel Kapouytian Woods LLP (57) ABSTRACT

A tagging structure is used in web pages to identify content in such web pages that can be dragged and dropped into a wireless device when such web pages are rendered as a component of a web page served by a media management service.

14 Claims, 6 Drawing Sheets

FIGURE 6 though such third party web services provides web pages that
APPLICATION PROGRAMMING INTERFACE FOR TRANSFERRING CONTENT FROM THE WEB TO DEVICES

BACKGROUND OF THE INVENTION

1. Field of the Invention

The present invention generally relates to management of content for mobile devices and, more specifically, to transferring content from third party web sites to mobile devices.

2. Description of the Related Art

Current web services enable users to access and store their personal content on remote servers by interacting with web pages served by the web services rather than store such personal content locally on their computers. For example, users may store and manage their photos on an online photo hosting and sharing web service such as Kodak Gallery or an online social network service such as Facebook. Similarly, users may create playlists and stream music to their local computers from music-focused web services such as MySpace Music. Users may also utilize an online storage web service such as Box.net to backup their personal content and have access to their content at any location through a web browser.

However, while these web services provide web pages that are designed for convenient access to user content through a web browser, such web pages are not designed to provide the capability to transfer such stored content to a users' mobile devices. To re-design or provide web pages designed specifically to transfer content to a user's mobile devices is prohibitively expensive and time consuming.

SUMMARY OF THE INVENTION

One or more embodiments of the present invention provide methods for enabling pre-existing designed web pages to support transfer of content stored at the web service serving such web pages to a user's mobile devices. Specifically, a media management service as described herein provides a tagging structure that can be added to the web code of pre-existing web pages of web sites to identify content that can be transferred to a user's mobile device when the web pages of such web sites are rendered within another web page that is served by the media management service itself.

A method for obtaining content stored on a remote server through a web page for delivery to a wireless device, according to one embodiment of the present invention includes the steps of receiving web page code from a third party web server, wherein an HTML element in the web page code that relates to the content is wrapped in a tagging structure, displaying the web page code in a component of the web page, obtaining a source URL from the tagging structure upon a selection by a user of the HTML element relating to the content as displayed in the component of the web page, and transmitting the source URL to a media management server upon a drop action by the user into a representation of a wireless device in a second component of the web page, wherein the media management server retrieves the content by transmitting the source URL to the remote server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
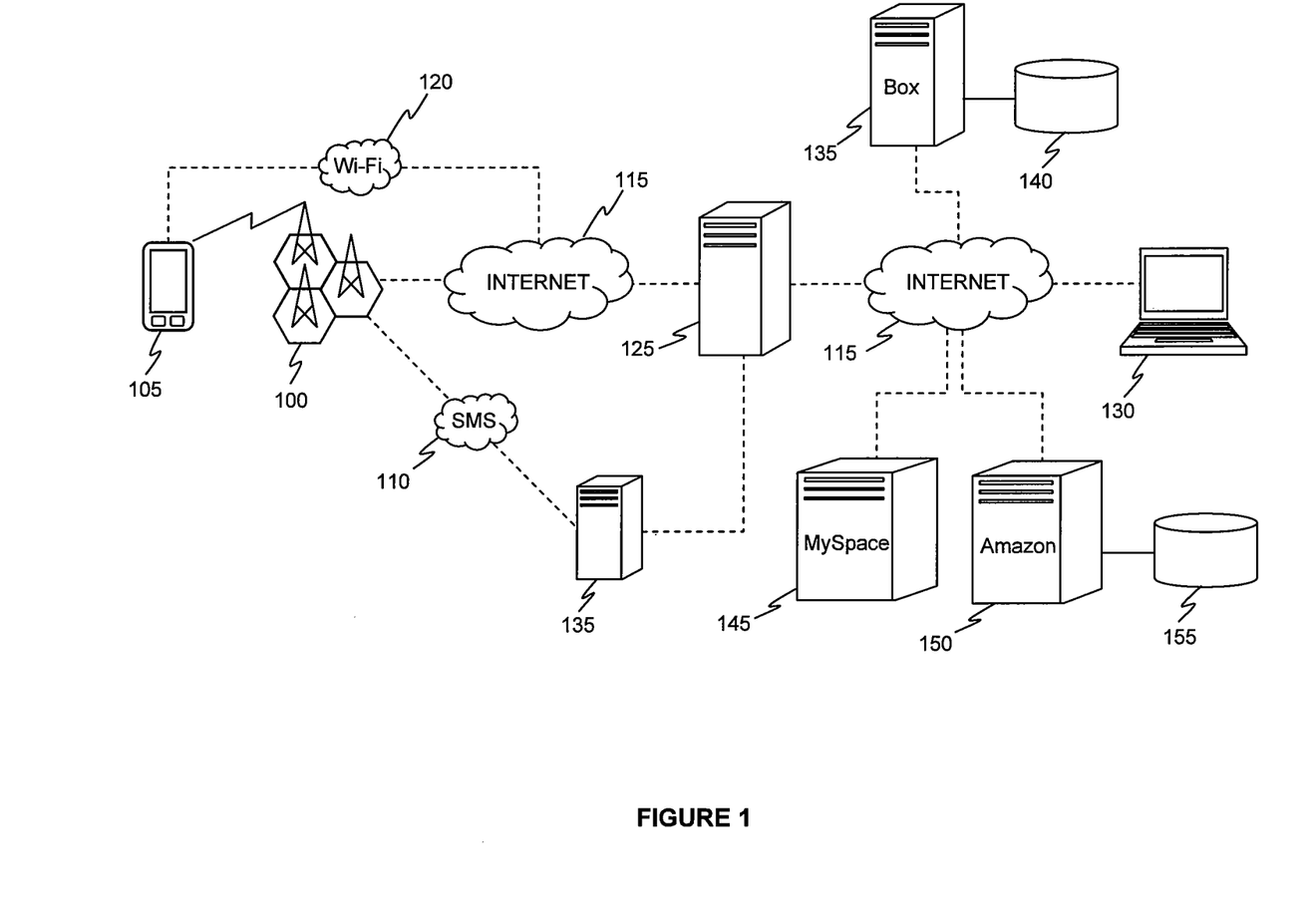
FIG. 1 depicts one embodiment of a web computing environment in which to deploy embodiments of the present invention.

FIG. 1 depicts one embodiment of a web computing environment in which to deploy embodiments of the present invention. An underlying digital cellular wireless network system 100 in this environment may be a 3.5G network such as HSDPA/UMTS (High Speed Downlink Packet Access/Universal Mobile Telephone System). Other possible digital cellular wireless network systems would include, without limitation, all other forms of 2.5G (e.g., GPRS, EDGE, etc.), 3G (e.g., TD-SCDMA, CDMA2000, etc.), 3.5G and future generations of packet-switched cellular wireless technologies. The underlying digital cellular wireless network system 100 supports packet-switching capability and implements an IP-based network that supports TCP/IP based communications by mobile device 105 in order to access Internet 115. Mobile device 105 may also directly access Internet 115 through WiFi 120 (Wireless LAN services based on IEEE 802.11 standards) or other similar technologies. Current examples of mobile devices (e.g., smartphone, PDA handheld, etc.) that may be used in accordance with the present invention are the Blackberry Bold or Storm. Additionally, digital cellular wireless network system 100 also supports text messaging services such as SMS (Short Message Service) 110.

By obtaining an IP address from digital wireless network system 100 or through WiFi 120, mobile device 105 is able to communicate through the Internet 115 to a media management service 125. Media management service 125 also accesses an SMS gateway 135 in order to send SMS messages to mobile device 105. One example of such a media management service 125 is described in U.S. patent application Ser. No. 11/674,081 entitled "Method and System for a Hosted Mobile Management Service Architecture," which is hereby incorporated by reference (the "'081 Application").

In addition to communicating with mobile device 105, media management service 125 also serves web pages to an end user using an Internet connected terminal with a web browser such as 130 (e.g., laptop, personal computer, etc.) who has logged into his personal account with media management service 125. Such an end user may also access a variety of other web services other than media management service 125. Examples shown in FIG. 2 include an online storage service such as Box.net 135 that enables users to store (e.g., in storage facilities 140) and access their personal content, including media files and documents, through the Internet 115 via a web browser on terminal 130, an online social network service, such as MySpace 145, that enables users to communicate and socialize online with friends, and an ecommerce web service, such as Amazon 150, that, for example, enables users to purchase digital music stored in Amazon's online storage facilities 155.

Figure 2:
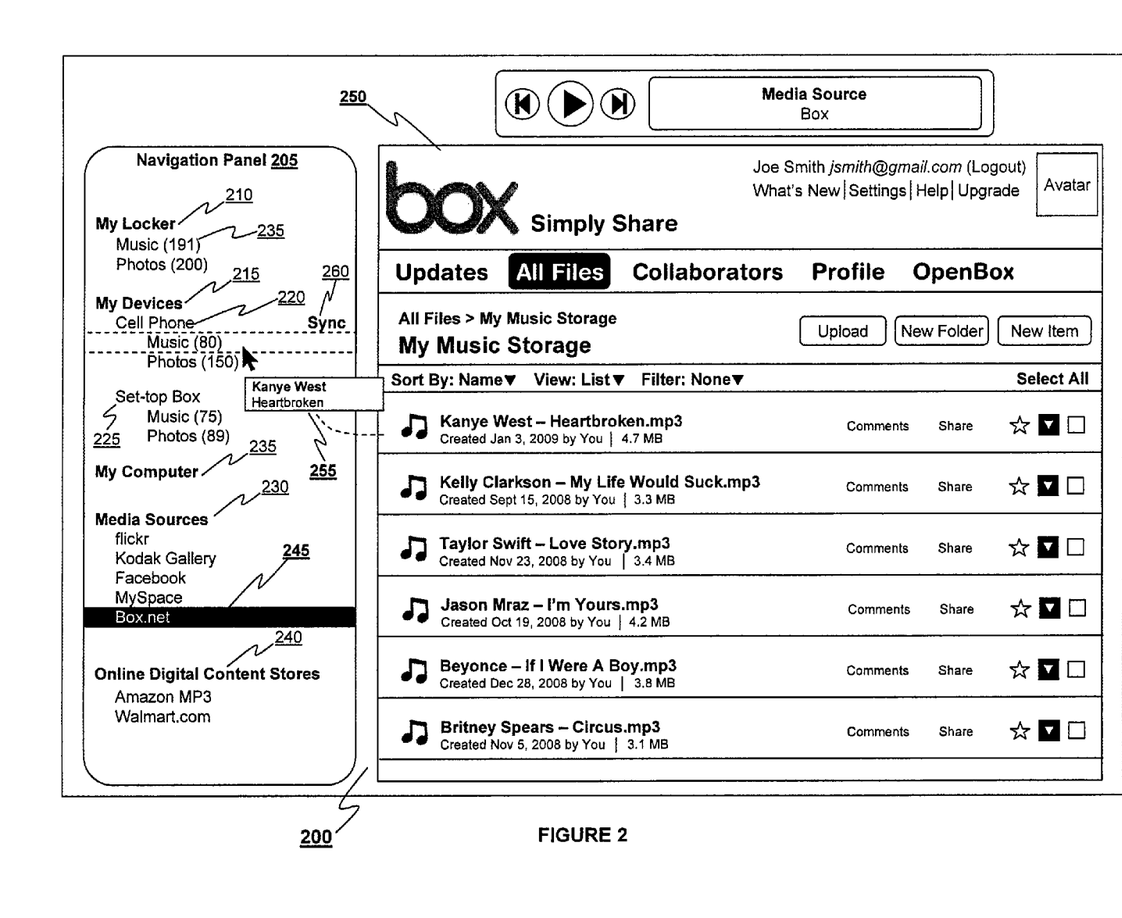
FIG. 2 depicts a web-based user interface served to a user logged into a media management service according to one embodiment of the present invention.

FIG. 2 depicts a web-based user interface 200 served to a user logged into media management service 125 through a web browser of terminal 130. A navigation panel 205 enables the user to select and view a variety of digital content collections (e.g., music, photos, video, other rich-media and multimedia formats, etc.), including digital content stored or otherwise managed by media management service in a locker 210, digital content stored in the user's various devices 215 such as cell phone 220 and set top box 225, as well as any of a number of third party web services that may be used as media sources 230 by the user to store or otherwise manage digital content. The user can further make a selection to navigate his computer 235 to find locally stored digital content and select a number of online digital content stores 240 to discover new digital content for purchase.

As depicted by highlight 245 of FIG. 2, the user has selected his online storage web service (i.e., Box.net 135) under his media sources 230 to view his music collection stored therein (i.e., in storage facilities 140). Selection of the online storage web service in navigation panel 205 causes display window 250 to display the online storage web service's landing page corresponding to the user's online storage account and enables him to navigate through the online storage web service's web pages to his music collection stored therein (shown in display window 250). In the embodiment of FIG. 2, display window 250 is an inline frame that supports an embedded web browser enabling users to navigate the web pages of third party web sites similar to a standalone web browser. User interface 200 may include web browser plug-in technology, such as an Active X control, to support the capability to drag and drop content across and between the embedded web browser of display window 250 and navigation panel 205. One embodiment may utilize the plug-in and other techniques as described in U.S. patent application Ser. No. 11/862,179 entitled "Method and System for Transferring Content from the Web to Mobile Devices," which is hereby incorporated by reference. It should be recognized that the portrayal in the various figures herein of third party services such as Box.net 135, MySpace 145 and Amazon 150 are merely exemplary (to provide further context to the descriptions herein) and are not intended to depict the actual look and feel of any commercial implementation of such services.

As depicted in 255 of FIG. 2, a user desiring to copy a song (e.g., Kanye West's Heartbroken) from his music collection stored in storage facilities 140 of online storage service 135 to his cell phone 220 selects the selected song displayed in online storage service's 135 web page presented in display window 250, drags and drops the song into his cell phone 220 and presses the select link 260 to initiate wireless delivery of the song the cell phone (e.g., in accordance with techniques described in the '081 Application). In order to enable identification of content that can be dragged and dropped from a third party web service's web pages into media management service's 125 navigation panel 205, media management service 125 provides an HTML tagging structure for third party web services to incorporate into their web pages to identify draggable content when such web pages are presented in display window 250.

Table 1 displays one embodiment of a tagging structure provided by media management service 125 that other third party web service's can incorporate into the HTML code of their web pages:

TABLE 1

Tagging Structure

Tagging Structure
  <x-transfer
    mime-type = "..."
    src-url = "..."
    provider-id = "..."
    provider-name = "..."
    item-cost = "..."
    item-name = "..."
    xfer-method = "..."
  />
Example of Tagging Structure in HTML Code of Web Page
  <x-transfer
    mime-type = "audio/mp3"
    src-url = "http://webservice.com/song.mp3"
    provider-name = "Web Service Name"
    provider-id= "2hjfdloir98">
  <href="http://webservice.com/song.mp3">Kanye
  West-Heartbroken</href>
  </x-transfer>

Figure 3:
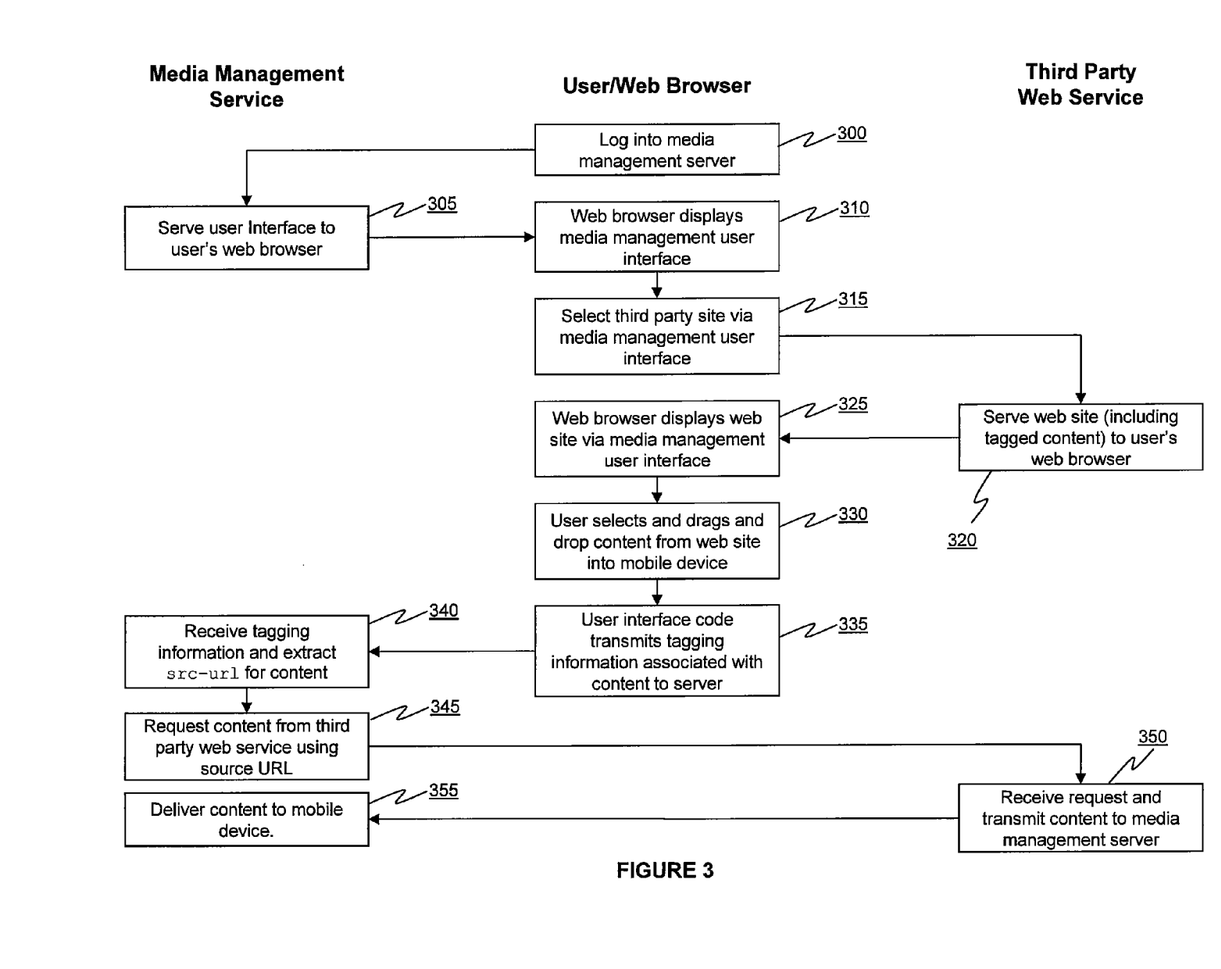
FIG. 3 depicts a flow chart of the interaction between a media management service, a user's web browser and a third party web service.

In the embodiment of Table 1, the tagging structure is an HTML element named "x-transfer" that has a number of associated name-value pairs. For example, mime-type is a name-value pair used to define the media type (e.g., audio, video, photo, etc.) associated with the content to be transferred to a user's devices via user interface 200, src-url is a name value pair that contains a Uniform Resource Locator (URL) where the associated content can be fetched and is utilized by media management service 125 to retrieve such content, provider-id is a name-value pair that identifies the web service where the content is stored to media management service 125, provider-name is a name-value pair that provides the name of the web service, item-cost is a name-value pair that identifies a cost associated with the content if a purchase transaction is involved, item-name is a name-value pair with a general description of the associated content, and xfer-method is a name-value pair that identifies a user action that may be utilized to obtain such content, such as, for example, by dragging and dropping or by pressing a button. As depicted in the example in Table 1, a third party web service wraps HTML elements in its web pages that it desires to make available for transfer to a user's devices through user interface 200 with the foregoing tagging structure. It should be recognized that the foregoing name-value pairs of the tagging structure may be optional depending upon the content and information desired to be transmitted by the third party web service to media management service 125. It should be further recognized that the tagging structure of Table 1 is merely exemplary and that additional and/or alternative name-value pairs may be added to the tagging structure to provide further information for media management service 125 and that any variety of naming conventions for the tagging structure and associated name-value pairs can be used. For example, additional name-value pairs such as a transaction type value to describe the type of transaction (e.g., free transfer, purchase, etc.) or a referrer value to indicate a web service that originates a digital media purchase transaction at an ecommerce site (e.g., MySpace site triggers an Amazon MP3 digital song purchase, etc.) may be added to a tagging structure in various embodiments. Similarly, additional name-value pairs such as time and frequency of update values to describe how often associated content may be updated by a third party web service (e.g., certain podcasts of radio shows may get updated daily every morning, etc.) may also be added to a tagging structure in various embodiments FIG. 3 depicts one embodiment of the interaction between media management service 125, a user's web browser and a third party web service presented in display window 250 when a user drags content from a web page of the third party web service to his mobile device. In step 300, a user logs into media management service 125 through a web browser. In step 305, media management service 125 serves user interface 200 to the user's web browser. In step 310, the user's web browser displays user interface 200 and in step 315, the user selects a desired third party web service from media sources 245 in navigation panel 205. Upon selection of the desired third party web service, the web browser transmits a request to the third party web service and in step 320, the third party web service serves its web pages to user's web browser, which displays the web pages in display window 250 in step 325. The source code (e.g., HTML and related client side code) of the served web pages include the tagging structure of Table 1 to identify any content that is transferable from the third party web service to a user's devices through media management service 125. When the user selects an item of content (e.g., audio file, photo file, video file, other rich media files, etc.) in a served web page whose corresponding HTML element has been wrapped with a tagging structure, he is then able to drag and drop the HTML element from display window 250 to his cell phone 220 (or other device) in navigation panel 205 in step 330. Web code (e.g., HTML, JavaScript, plug-in code, etc.) for user interface 200 recognizes when a user selects an HTML element surrounded by a tagging structure and initiates a transmission of the name-value pairs of the tagging structure to media management service 125 when the user drops the selected item into cell phone 220 in step 335. In step 340, media management service 125 extracts the src-url from the received name-value pairs and transmits a request including the src-url to the third party web service to retrieve the content in step 345. In step 350, the third party web service receives the request and transmits the content to media management service 125, which is then able to deliver the content to the user's cell phone, such as 105, for example, upon initiation of delivery by the user (e.g., pressing sync link 260 in user interface 200) in step 355.

In one embodiment, the steps of 345 and 350 for requesting and receiving content from the third party web service may be implemented as a standard HTTP GET or POST request if the src-url is a HTTP URL containing the file name of the content itself (i.e., "in-the-clear"). In alternative embodiments, the src-url provided by the third party web service does not contain the file name in-the-clear but rather contains content identifying information (e.g., a content identification number or code rather than the file name of the content itself, etc.) and is translated by a request handler of the third party web service upon receiving the request from media management service 125 in step 345. In one such alternative embodiment, for example, a third party web service desiring to make its web pages available in media management service 125 registers with media management service 125 and receives a secret key associated with its provider-id. In step 340, upon receiving the name-value pairs from the tagging structure, media management server 125 then extracts the provider-id value, obtains the secret key associated with the provider-id, and submits the secret key along with the src-url in step 345 to the third party web service (for example, via HTTPS for added security). Upon receiving the secret key and src-url in step 350, the third party web service confirms that the request is from media management service 125 (by confirming the secret key), extracts the information identifying for the content from the src-url and transmits the content to media management service 125.

In one embodiment, the third party web service may permit access to content associated with the src-url in step 350 only if information relating to a user's identification is provided to the third party web service. For example, the content associated with the src-url may be personal content owned by the user (rather than publicly available content). In one such embodiment, in step 335, along with transmission of tagging information, the user's web browser additionally transmits to media management service 125 a web session cookie associated with the user's browsing session with the third party web service as conducted within display window 250. Media management service 125, in turn, transmits the web cookie to the third party web service in the request of step 345. Upon receiving the web cookie in step 350, the third party web service is able to confirm an association of the user with web management service 125 and transmits the content to web management service 125.

Figure 4:
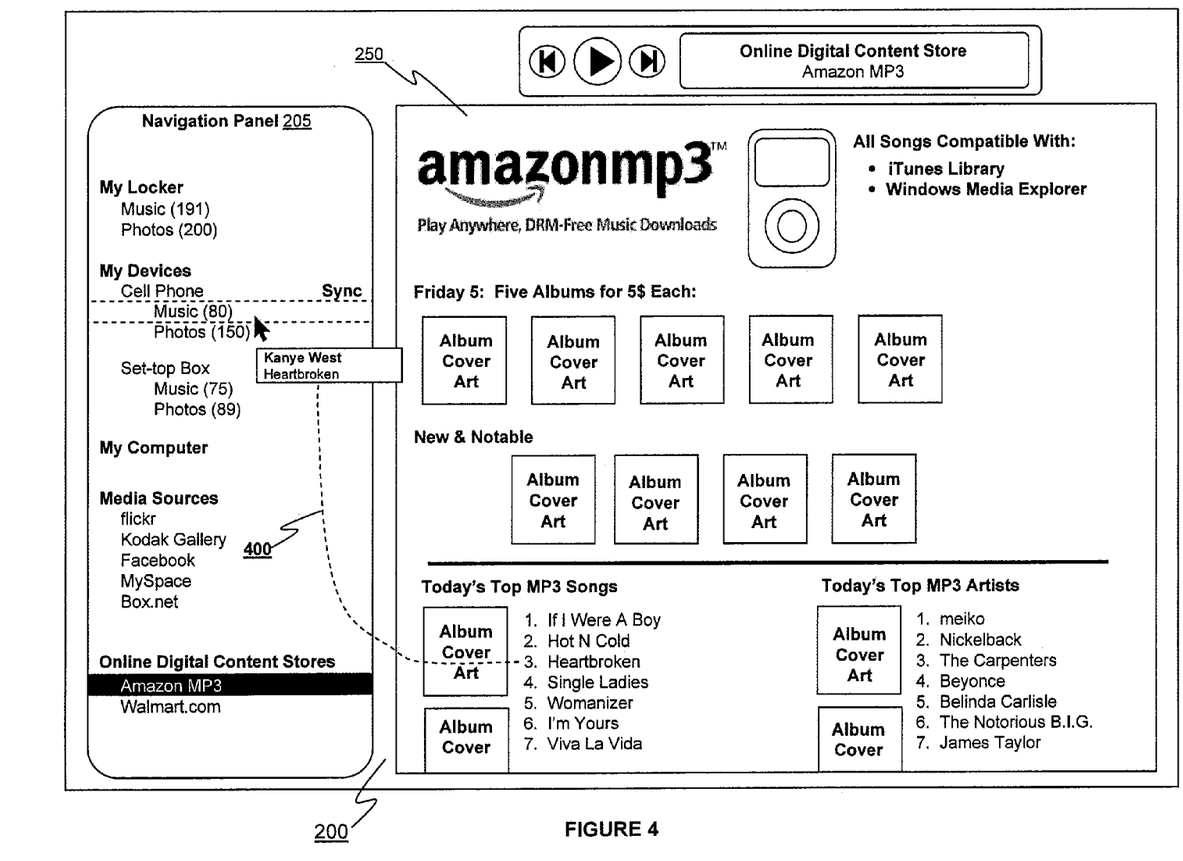
FIG. 4 depicts a web-based user interface with a user accessing an ecommerce web service.

FIG. 4 depicts web-based user interface 200 with a user accessing an ecommerce web service for digital music (i.e., Amazon MP3) in display window 250. A user selecting a digital song to drag (see 400) into his device during step 330 of FIG. 3 triggers additional payment transaction steps in the interaction between media management service 125 and the ecommerce web service during steps 345 and 350. In one embodiment, media management service 125 may additionally provide a user's payment particulars (e.g., credit card, billing address, etc.) to the ecommerce web service in step 345 to consummate a purchase transaction. Alternatively, media management service 125 may provide a user's web session cookie set by the ecommerce web service in display window 250 to identify the user, who may already have a payment account set up with ecommerce web service. It should be further recognized that yet another alternative embodiment may interact with a third party online payment gateway (e.g., PayPal, etc.) to complete the payment transaction utilizing a user's payment account at such a third party online payment gateway. In yet another alternative embodiment, media management service 125 may purchase the content itself from ecommerce web service and subsequently charge the user itself.

Figure 5:
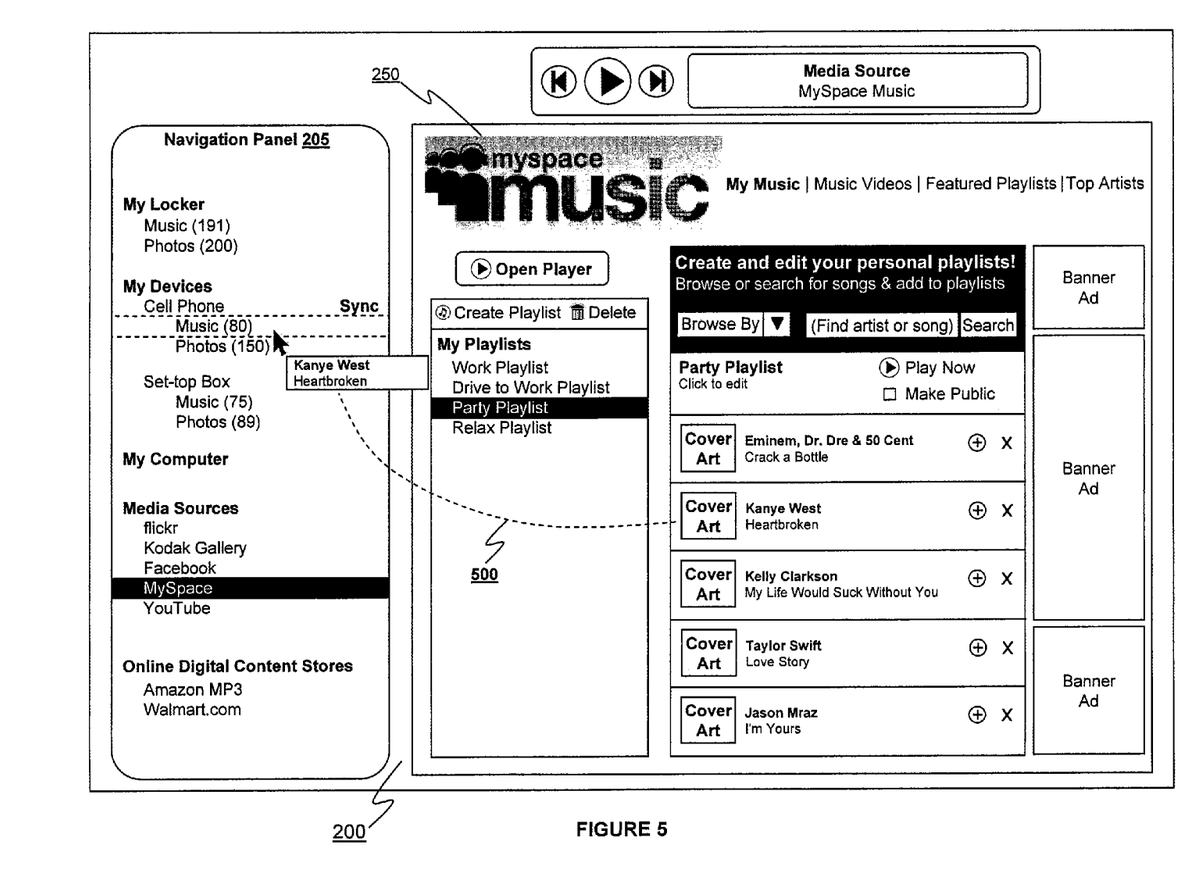
FIG. 5 depicts a web-based user interface with a user accessing a online social network service.
Figure 6:
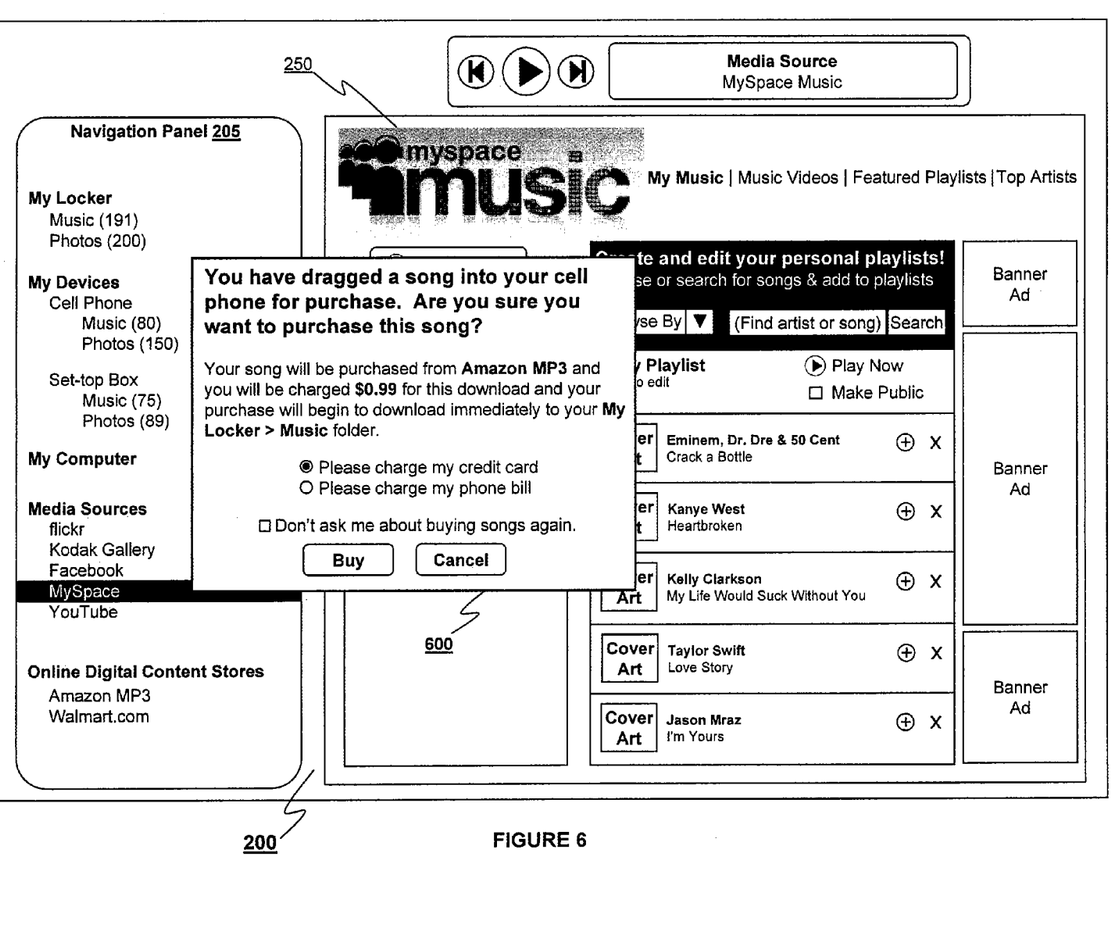
FIG. 6 depicts a pop-up window of a web-based user interface with a user purchasing music through an online social network service.

FIG. 5 depicts web-based user interface 200 with a user accessing a social network web service (i.e., MySpace) in display window 250. As depicted in FIG. 5, a MySpace Music site provides the user a playlist of songs that can be streamed to the site but does not provide the capability to download such songs to a mobile device or terminal. Instead, if desired, the user can purchase a selected song in the web page of the social network site through an ecommerce site (such as Amazon MP3). Media management service 125 facilitates this purchase transaction when a user desires to purchase a song and transfer the song to his cell phone. As shown in 500, the social network service tags HTML elements relating to the songs in a playlist with the tagging structure of Table 1 such that when a user drags and drops a selected song from a playlist in display window 250 to navigation panel 205, the tagging structure is transmitted to media management service 125. In one embodiment, such a tagging structure includes a src-url and provider-id for an ecommerce site where the content can be purchased and an additional referral-id for the social network site. As further depicted in FIG. 6, upon dropping the selected content into navigation panel 205, user interface 200 displays a pop-up window 600 requesting confirmation that the user desires to purchase the selected content from the ecommerce site. Upon such confirmation, media management server 125 interacts with ecommerce site to consummate the purchase transaction and retrieve the desired content in accordance with the information provided in the tagging structure.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. For example, while the foregoing embodiments have utilized mobile devices such as cell phones, it should be recognized that any devices with wireless networking capabilities, such as wireless picture frames, set-top boxes, stereo system and the like may be used in alternative embodiments. Similarly, it should be recognized that alternative user interface designs may be used consistent with the scope of the present invention other than as set forth in FIGS. 2, 4, 5 and 6. For example, while embodiments herein describe display window 250 of FIG. 2 as an inline frame, it should be recognized that alternative embodiments can implement display window 250 as a plug-in, script embedded in HTML code or any other known technologies to render a third party web page within a component of another web page. Furthermore, those with ordinary skill in the art will recognize various methodologies to enable the extraction of the tagging structure from a third party web page when a user selects an HTML element relating to desired content in steps 330 and 335. For example, a click handler, mouse-over handler, drag handler and drop handler can each be registered to invoke a callback each time an HTML element that is wrapped with a tagging structure triggers the associated mouse action. Conversely, every mouse action can be checked to determine whether it relates to an HTML action wrapped with a tagging structure. It should further be recognized that the tagging structure of Table 1 is merely exemplary and that various embodiments can be customized to include any additional information that may be needed by media management service 125 when interacting with a third party web service where associated content may be stored. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

We claim:

1. A method to retrieve content stored on a third party remote server for delivery to a wireless device, the method comprising:
    sending a web page stored on the third party remote server to an end-user computer for display in a web browser, wherein the web browser displays a plurality of icons that correspond to content and wherein a tagging structure associated with the web page identifies content displayed on the web page that is available to a media management server for delivery to the wireless device, wherein content displayed on the web page that is identified by the tagging structure as unavailable is not available to the media management server for delivery to the wireless device, wherein a set of the unavailable content becomes available content when the end-user computer provides information that satisfies an access condition, wherein the tagging structure comprises a location of the content on a network that is available and an HTML code tag that specifies a cost associated with the content that is available;
    receiving, from the end-user computer, a selection of the content displayed on the web page that is identified as available by the tagging structure;
    retrieving the selected content from the network by using the location of the content from the tagging structure;
    delivering the retrieved selected content to the wireless device in response to the selection from the end-user; and
    charging an account associated with the wireless device for the cost specified by the HTML code tag in response to the delivery of the selected content to the wireless device.

2. The method as set forth in claim 1, wherein the HTML code tag specifies a media type of the selected content.

3. The method as set forth in claim 1, wherein the tagging structure is to indicate that the selected content may be selected and delivered to the wireless device by a drag and drop operation.

4. The method as set forth in claim 1, wherein the third party remote server comprises a social network or an online store.

5. A non-transitory computer-readable medium that includes instructions that, when executed by a processing unit, causes the processing unit to retrieve content stored on a third party remote server for delivery to a wireless device by performing the steps of:

sending a web page stored on the third party remote server to an end-user computer for display in a web browser, wherein the web browser displays a plurality of icons that correspond to content and wherein a tagging structure associated with the web page identifies content displayed on the web page that is available to a media management server for delivery to the wireless device, wherein content displayed on the web page that is identified by the tagging structure as unavailable is not available to the media management server for delivery to the wireless device, wherein a set of the unavailable content becomes available content when the end-user computer provides information that satisfies an access condition, wherein the tagging structure comprises a location of the content on a network and an HTML code tag that specifies a cost associated with the content that is available;

receiving a selection of the content displayed on the web page that is identified by the tagging structure;

retrieving the selected content from the network by using the location of the content from the tagging structure;

delivering the retrieved selected content to the wireless device in response to the selection from the end-user; and     charging an account associated with the wireless device for the cost specified by the HTML code tag in response to the delivery of the selected content to the wireless device.

6. The non-transitory computer-readable medium as set forth in claim 5, wherein the HTML code tag specifies a media type of the selected content.

7. The non-transitory computer-readable medium as set forth in claim 5, wherein the tagging structure is to indicate that the selected content may be selected and delivered to the wireless device by a drag and drop operation.

8. The non-transitory computer-readable medium as set forth in claim 5, wherein the third party remote server comprises a social network or an online store.

9. A system comprising:

at least one computer with a processor and memory; a third party remote server; an end-user computer; a network; a media management server; a wireless device; and a non-transitory computer readable medium having stored thereon one or more programs, which when executed by the at least one computer, cause the system to:

send a web page stored on the third party remote server to the end-user computer using the network for display in a web browser, wherein the web browser displays a plurality of icons that correspond to content and wherein a tagging structure associated with the web page identifies content displayed on the web page that is available to the media management server for delivery to the wireless device, wherein content displayed on the web page that is identified by the tagging structure as unavailable is not available to the media management server for delivery to the wireless device, wherein a set of the unavailable content becomes available content when the end-user computer provides information that satisfies an access condition, wherein the tagging structure comprises a location of the content on a network and an HTML code tag that specifies a cost associated with the content that is available;

receive a selection of the content displayed on the web page that is identified by the tagging structure;

retrieve the selected content from the network by using the location of the content from the tagging structure; and     deliver the retrieved selected content to the wireless device in response to the selection from the end-user; and     charge an account associated with the wireless device for the cost specified by the HTML code tag in response to the delivery of the selected content to the wireless device.

10. The system as set forth in claim 9, wherein the HTML code tag specifies a media type of the selected content.

11. The system as set forth in claim 9, wherein the tagging structure is to indicate that the selected content may be selected and delivered to the wireless device by a drag and drop operation.

12. The method of claim 1, wherein the set of the unavailable content comprises all the unavailable content.

13. The non-transitory computer-readable medium as set forth in claim 5, wherein the set of the unavailable content comprises all the unavailable content.

14. The system as set forth in claim 9, wherein the set of the unavailable content comprises all the unavailable content.

\* \* \* \* \*